Figure 1:
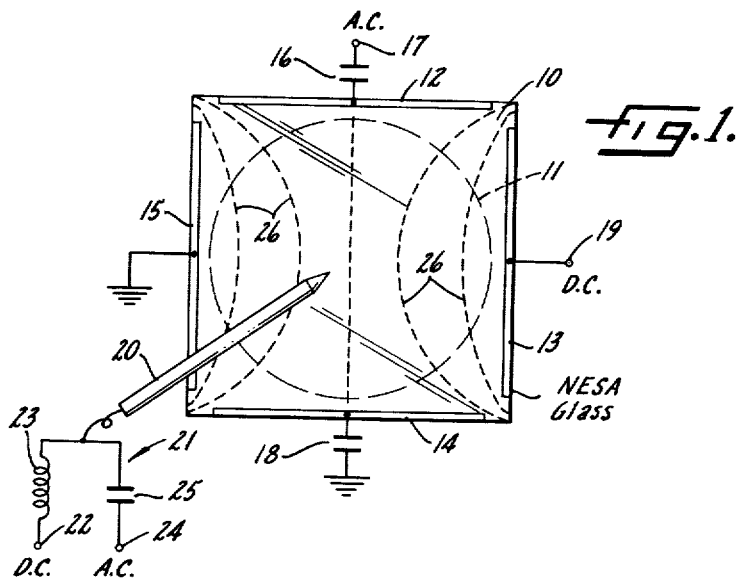

Oct. 8, 1963

F. T. THOMPSON 3,106,707

CONDUCTING DATA TAKE-OFF PENCIL

Filed Dec. 4, 1961

2 Sheets-Sheet 1

INVENTOR.
Francis T. Thompson,
BY H. H. Loeckle
Attorneys.

INVENTOR.
Francis T. Thompson,
BY
H. H. Loucks
Attorneys.

United States Patent Office 3,106,707
Patented Oct. 8, 1963

3,106,707
CONDUCTING DATA TAKE-OFF PENCIL
Francis T. Thompson, Palo Alto, Calif., assignor, by mesne assignments, to the United States of America as represented by the Secretary of the Navy
Filed Dec. 4, 1961, Ser. No. 157,331
7 Claims. (Cl. 343—7.3)

This invention relates to a target acquisition means of taking co-ordinate target information off of a cathode ray tube display screen with a conductive pencil, and more particularly this invention relates to a conductive data cathode ray tube screen overlay providing two mutually perpendicular electric fields with low field distortion to establish the electrical co-ordinates for the conducting data take-off pencil.

The art of tracking radar acquisition of a target for tracking purposes must ordinarily be acquired by some manually controlled selective means to enable tracking circuits of the radar to lock on and track the selected target. With the coming of faster aircraft, the means for manually acquiring target information should be made as simple as possible to enable operating personnel to perform target acquisition accurately in the minimum of time. In one known target acquisition means, a photoelectric pencil is placed against the cathode ray tube screen at the position of an indicated target, and when the beam scans over this pencil, a pulse is obtained which produces the desired co-ordinates of target position. One of the disadvantages of this target acquisition means is that the photoelectric pencil must be held in place until the area is scanned. This means also requires amplifiers and time position converters. Another known means of target acquisition is by the use of a flexible arm pantograph which consists of a mechanical pencil for positioning over the display target of the cathode ray tube to position potentiometers from which the electrical co-ordinate signals are taken. Some of the disadvantages by the use of this means are that reliability and accuracy are very poor. Still another target acquisition means is by use of a joy stick to control mechanically related potentiometers electrically coupled to the deflection plates of the cathode ray tube to produce a maneuverable circle which may be positionable to encircle the target display on a cathode ray tube, the output of these potentiometers providing the electrical co-ordinates of the target. Some of the disadvantages of this latter joy stick target acquisition means are that it is time consuming, it requires good manual co-ordination, and it requires experienced operating personnel. The present invention has been conceived with a view of eliminating the disadvantages of these prior systems and to take advantage of human speed without mechanical or electrical delay in target acquisition.

In the present invention, an electrically conductive transparent overlay is provided for a radar cathode ray tube display which transparent overlay has two mutually perpendicular electric fields established thereon. It has been found preferable to establish one of the electric fields by direct current voltage and the other electric field by an alternating current voltage whereby any co-ordinate point may be established by an electrically conductive take-off pencil in contact with the electrically conductive transparent overlay material. Whenever a target appears on the fluorescent screen of the cathode ray tube, the electrically conductive pencil is placed to contact the electrically conductive overlay directly over the indicated target. The voltage from each field will be picked up by the data take-off pencil and conducted through a separation circuit to separate the direct current potential from the alternating current potential for the tracking circuits of the radar system. This tracking system is more particularly shown and described in my patent application, Serial Number 79,474 (1960 series), filed December 29, 1960, titled "Acquisition Time Reduction." Since the alternating current field in the electrically conductive overlay affects the direct current field, and vice versa, this invention contemplates the use of parallel grid conductors across the conductive overlay in one direction to establish linear equipotential grid voltage lines for both the alternating current voltage field and the direct current voltage field. The parallel grid conductors may consist of painted conductive strips on the transparent overlay material or conductive wire embedded therein. The grid conductors should have a higher conductivity than the conductive overlay and should be used in quantity sufficient to produce the necessary equipotential lines to provide accurate co-ordinate information for the target tracking circuits of the radar. The electrically conductive transparent overlay material may be of NESA glass or other similar material of controlled conductivity. It is therefore a general object of this invention to provide an electrically conductive transparent overlay for the cathode ray tube display screen of a radar which overlay has mutually perpendicular electric fields established thereon with means to establish equipotential linear voltage lines for each electric field capable of producing co-ordinate voltages in a conducting data take-off pencil at any point over the fluorescent screen of the cathode ray tube.

Figure 2:
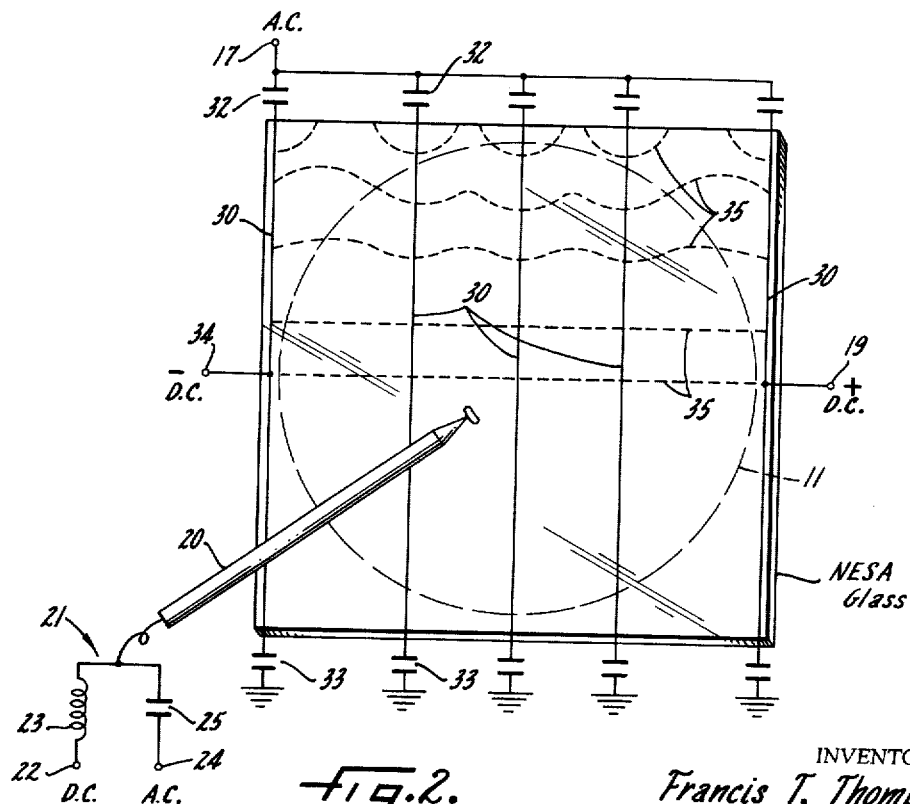
Figure 3:
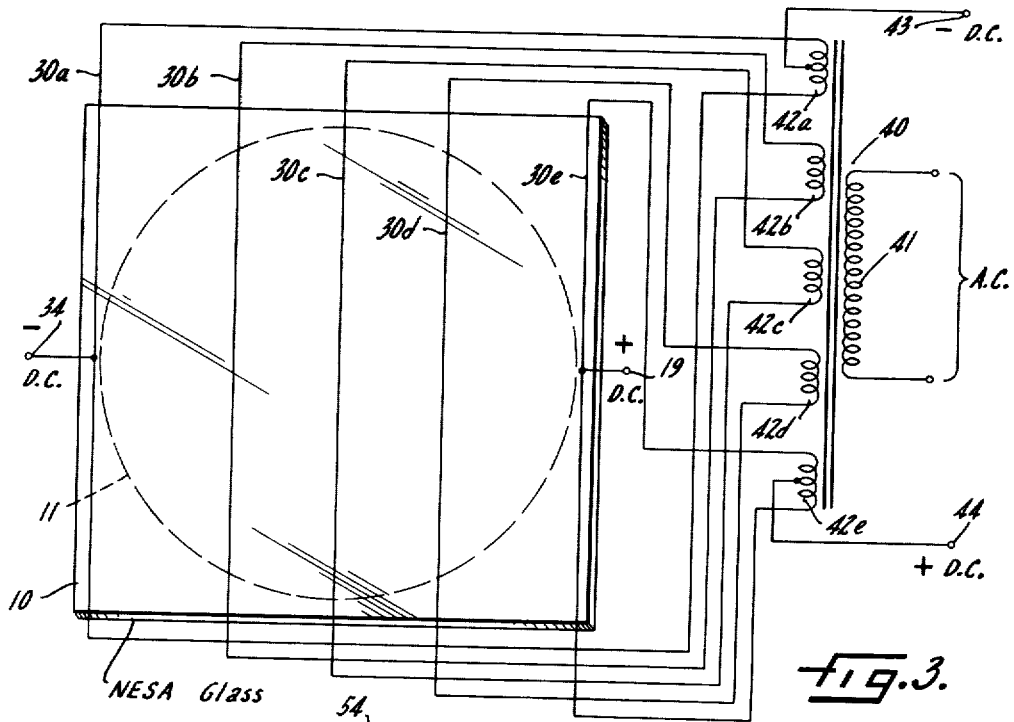
Figure 4:
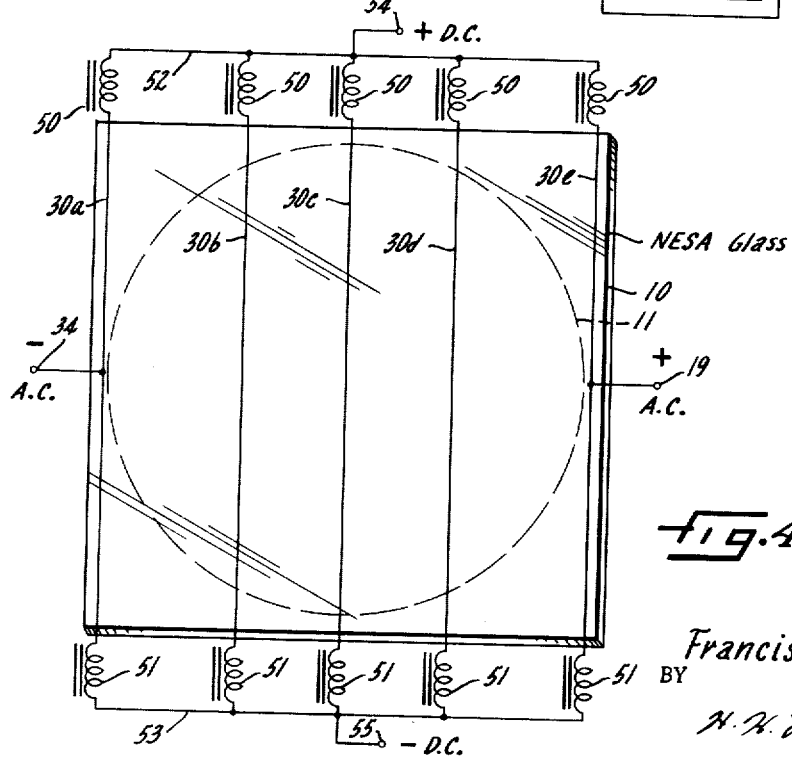

These and other objects and the attendant advantages, features, and uses, will become more apparent to those skilled in the art as the description proceeds when taken in consideration of the accompanying drawings, in which:

FIGURE 1 illustrates an electrical conductive transparent overlay having alternating current and direct current voltages applied to the peripheries to establish two electric fields, FIGURE 2 illustrates, as an enlargement of FIGURE 1, the use of grid conductors to establish equipotential voltage lines for both electric fields across the cathode ray tube screen, FIGURE 3 illustrates another modification of the invention shown in FIGURE 2, and FIGURE 4 illustrates still a further modification of the invention shown in FIGURE 2.

Referring more particularly to FIGURE 1, there is illustrated in rectangular configuration an electrically conductive transparent overlay 10 of NESA glass, or other like conductive material, positionable over a cathode ray tube screen illustrated herein by the broken line circle 11. Each of the four peripheries of the electrically conductive transparent material 10 has an electrical conductor fixed thereto such as 12, 13, 14, and 15, each peripheral conductor being electrically isolated from the rest. An alternating current voltage source is applied from terminal 17 across opposite peripheral conductors 12 and 14 through capacitors 16 and 18 to ground or opposite terminal of the alternating current voltage source while a direct current voltage is applied across the peripheral conductors 13 and 15, as from a terminal 19 to ground or opposite terminal of the direct current voltage source. The capacitors 16 and 18 permit the application of the alternating current voltage but block conduction of the direct current voltage. An electrically conductive data take-off pencil 20 is manually positionable at any point on the electrically conductive overlay 10 and will pick up both the alternating current and the direct current voltages at the point of contact of amplitudes proportional to the co-ordinate point in the voltage fields and apply these voltages to a separation circuit illustrated herein by the reference character 21. The separation circuit 21 is shown in the simplest form for the purpose of illustration as separating the direct current voltage at the output terminal 22 by virtue of conduction through an inductance coil 23. The alternating current voltage is taken from the output terminal 24 by virtue of passing the alternating current through a direct current blocking capacitor 25.

While the direct current and alternating current voltages picked up by the data take-off pencil 20 in FIGURE 1, produce accurate co-ordinate voltages from any position on the perpendicular center lines of the conducting overlay, voltages picked up at other positions will be at variance from the true co-ordinates, since the alternating current voltage lines are distorted by electrodes 13 and 15 which introduce the direct current potential and the direct current voltage lines are distorted by each of the other electric fields. To illustrate this, the direct current voltage lines in the direct current electric field are distorted by electrodes 12 and 14 as shown by dotted lines 26. A similar illustration could be given for the alternating current field. Accordingly, any position of the data take-off pencil in any of the four quadrants away from the vertical and horizontal center lines will produce erroneous co-ordinate voltages which will be sufficiently off of a true co-ordinate position to frustrate ready target acquisition for the tracking circuits of the radar. The voltages, of course, should be of an amplitude suitable for use in tracking circuits or as the application requirements of the co-ordinate outputs dictate.

In FIGURE 2, a more idealized perpendicular field pattern is established on the electrically conductive transparent overlay 10 for the cathode ray tube screen 11 of a radar. Substantially linear equipotential voltage lines are established by means of grid conductors 30 placed in parallel across the alternating current voltage field established from the application of alternating current voltage at terminal 17. The alternating current voltage supplied at 17 is applied to each of the five conductors illustrated through direct current blocking capacitors 32, the opposite terminal of the alternating current voltage, disclosed herein as being ground, is likewise coupled through direct current blocking capacitors 33 to the grid conductors. The grid conductors 30 may be painted conductive strips on the electrically conductive transparent overlay 10, or electrical wire embedded therein but those grid conductors 30 must be of higher conductivity, or of lower resistance, than that of the electrically conductive overlay 10. The direct current voltage source is applied to the outermost grid conductors 30 as shown in FIGURE 2. The direct current potential terminal 19 is directly coupled to the outermost grid conductor 30 on the right of the electrically conductive overlay 10, and the negative direct current voltage source is coupled through the terminal 34 to the left-hand grid conductor 30. By this arrangement, the alternating current potential is applied across opposite ends of the grid conductors, and the alternating current potential will vary in proportion to the distance from the alternating current ground to the highest potential at the capacitors 32. A direct current voltage field will be established between extreme right-hand and left-hand grid conductors 30, the intermediate grid conductors 30 operating between the capacitors 32 and 33 to establish equipotential direct current voltage lines across this field. The grid conductors 30 do not disturb the direct current field since they coincide with the equipotential lines of direct current. The upper half of the electrically conductive overlay 10 illustrates the alternating current voltage lines by dotted lines 35. As may be seen by these voltage lines, they have been considerably equipotential straightened from those illustrated in FIGURE 1, and it may be understood that these equipotential lines could be made more linear by the addition of grid conductors 30. As illustrated in FIGURE 2, only five grid conductors are shown with the central grid conductors being closer together than the peripheral conductors to insure greater linearity within the confines of the periphery of the cathode ray display tube 11. Additional grid conductors would improve the linearity of the equipotential lines of the direct current voltage field as well as the alternating current voltage field over the whole conductive overlay. Positioning of the data take-off pencil 20 at any point on the electrically conductive overlay 10 will produce both alternating current and direct current potential on the data take-off pencil 20 proportional to the position of the data-take-off pencil 20 in the direct current and alternating current fields. These co-ordinate voltages picked up will be separated in the separation circuits 21 to produce a direct current voltage at the output terminal 22 proportional to the position of the data take-off pencil across the direct current field and alternating current potential will be developed at the output terminal 24 proportional to the position of the data take-off pencil 20 in the alternating current voltage field.

Referring to FIGURE 3, the transparent overlay 10 of NESA glass, or the like, may have the alternating current voltage applied directly to the grid conductors 30 from isolated sources. It should be obvious to those skilled in the art that the capacitors 32 and 33 of FIGURE 2 may be eliminated if a separate alternating voltage source is applied across the ends of, or in circuit with, each grid conductor 30 and isolated so as not to disturb the direct current field. This may be accomplished by using a transformer 40 supplied alternating current voltage through a primary winding 41 to induce alternating currents into a plurality of secondaries 42a–42e which are each separately coupled across corresponding grid conductors 30a through 30e. To insure that the same magnitude of alternating current voltage is induced in each secondary winding, the secondary windings should be multifilar wound and have identical numbers of turns. The secondary windings should all be connected in the same polarity so that the upper ends of all grid conductors 30a through 30e experience the same instantaneous voltage with respect to their lower ends. It should also appear obvious to those skilled in the art that the direct current potential may be applied to center-taps of the secondaries 42a and 42e through the terminals 43 and 44 with the polarity as shown in FIGURE 3. The terminals and taps 19 and 34 on the grid conductors 30a and 30e could then be eliminated. The two voltage fields would be established over the transparent overlay 10 suitable for pick-off by a pencil 20, as shown in FIGURES 1 and 2. The illustration of the data take-off pencil 20 is not completed in FIGURE 3 since its function with the separation circuit 21 is sufficiently set forth in the descriptions of FIGURES 1 and 2.

Referring to FIGURE 4 where another modification of the means to establish the voltage fields is illustrated, the grid conductors 30a through 30e have the opposite ends thereof coupled through inductances 50 and 51 to common conductors 52 and 53, respectively. The common conductor 52 has a terminal 54 to which the positive polarity voltage of a direct current potential is to be coupled and the conductor 53 has a terminal 55 to which the negative polarity voltage of the direct current supply potential is to be coupled. In this modification the alternating current supply voltage is applied across terminals 19 and 34. Here the capacitors 32 and 33 of FIGURE 2 are replaced with inductances and the alternating current and direct current voltages interchanged to produce an operative conductive overlay 10. In this illustration the special relationship of the alternating current and direct current fields is interchanged. The inductances provide isolation for the alternating current voltage component existing between grid conductors 30. The inductances also provide a conducting path for the direct current. The grid conductors 30 are now equipotentials in the alternating current field while horizontal lines, such as lines 35 in FIGURE 2, would represent the equipotential lines in the direct current field for this illustrated modification. The data take-off pencil is not illustrated in FIGURE 4 but it is to be understood that a target shown on the display tube screen 11 would be picked up in co-ordinates in the same manner by the data take-off pencil 20 as described for FIGURE 2.

The electrically conductive overlay may be used on cathode ray tube display screens of radar for a "B" type scope, a "PPI" type scope or other scopes where pick-up is desired and the voltage fields are adapted for the output required. If a "B" type scope is used as more fitting to the illustrations in the drawings, the alternating current voltage field established will produce the co-ordinate voltage representative of range information, and the direct current voltage field will establish the co-ordinate voltage for azimuth information in FIGURES 1, 2, and 3. In the use of this overlay over the "B" type scope, the range voltage information will appear at the output terminal 24 while the azimuth information will appear at the output 22. On the other hand, where the electrically conductive overlay 10 is used on a "PPI" display tube, the alternating current voltage field will establish the latitude information at the output terminal 24, and the direct current voltage field will establish longitudinal position at the output terminal 22 for the illustrations of FIGURES 1, 2, and 3. The reverse would be true for the illustration of FIGURE 4. Information from the output terminals 22 and 24 can be applied to the tracking circuits of a radar system for lock-on and tracking of the target object appearing on the cathode ray tube target display screen 10 of such tracking radar.

In the operation of this invention, it is only necessary for the operator to position the point of the data take-off pencil 20 on a target object appearing on the cathode ray tube screen 11 which shows through the electrically conductive transparent overlay 10. This is the only operation necessary for the operator to provide target acquisition for the radar system, neither shown nor described, and target acquisition can be acquired with the speed with which the operator can position the take-off pencil directly over the target object appearing on the screen 11. Such a system also enables ready selection of a target object among several target objects so that acquisition of a selected target can be made with the immediate elimination of other targets.

While many of the attendant advantages and features of this invention may be acquired in other modifications and embodiments of the invention illustrated and described, without departing from the spirit and scope of this invention, applicant desires to be limited only by the scope of the appended claims.

I claim:

1. A data conducting surface for cathode ray tube co-ordinate display and data take-off pencils comprising: a current conducting transparent sheet for placement over the fluorescent screen of a cathode ray tube, said sheet having ohmic resistance in all linear directions thereof; a plurality of grid conductors straight and in spaced parallel relation across and affixed to said sheet, said conductors each having ohmic resistance per unit length less than said sheet; and alternating current and direct current voltage sources applied to said sheet, one voltage source of which is applied to the opposite ends of said grid conductors and the other voltage source of which is coupled across the outermost conductors of said grid conductors to provide substantially uniform mutually perpendicular electric fields thereacross with said grid conductors traversing said electric fields to establish equipotential lines of voltage in both said electric fields whereby every point on said sheet will produce simultaneously an alternating current potential and a direct current potential proportional to the position of the point on said respective electric fields.

2. A data conducting surface as set forth in claim 1 wherein said plurality of grid conductors are strips of metal fused to said current conducting transparent sheet and said transparent sheet is NESA glass material.

3. A data conducting surface for overlaying a cathode ray tube co-ordinate display as set forth in claim 1 wherein said one voltage source is said alternating current source applied to said grid conductors in parallel and said other voltage source is said direct current voltage applied to the outermost grid conductors.

4. A data conducting surface for overlaying a cathode ray tube co-ordinate display as set forth in claim 3 wherein the application of said alternating current to said grid conductors is through direct current blocking capacitors across the opposite ends and in parallel with said grid conductors.

5. A data conducting surface for overlaying a cathode ray tube co-ordinate display as set forth in claim 1 wherein said other voltage source is said alternating current voltage applied to the outermost grid conductors and said one voltage source is said direct current voltage and is applied through inductances and in parallel to opposite ends of said grid conductors.

6. A data conducting surface for overlaying a cathode ray tube co-ordinate display as set forth in claim 1 wherein said other voltage source is said direct current voltage applied to the outermost grid conductors and said one voltage source is a transformer transforming alternating current from a primary winding into a plurality of electrically isolated secondary windings, each secondary winding being coupled in parallel across the opposite ends of each grid conductor.

7. A data conducting surface for overlaying a cathode ray tube co-ordinate display of radar targets to take data therefrom by an electrically conductive data take-off pencil comprising: a square sheet of electrically conductive transparent material having a predetermined resistance in all linear directions to electrical conduction; a plurality of straight, parallel grid conductors extending from upper to lower peripheries of said square sheet to establish fixed equipotential lines, said grid conductors each having a resistance per unit length less than that of said sheet; an alternating current voltage applied across said upper and lower ends of said grid conductors through direct current blocking capacitors to establish a substantially linearly varying alternating current field from high potential to low potential between the upper and lower peripheries of said sheet; and a direct current voltage applied across the outermost grid conductor of each side of said sheet to establish a substantially linearly varying direct current potential field from high potential to low potential between said side peripheries and mutually perpendicular to said alternating current potential field whereby said plurality of grid conductors effectively establishes simultaneously equipotential lines in said alternating current and direct current potential fields which are substantially mutually perpendicular over all areas of said conductive sheet.

References Cited in the file of this patent

UNITED STATES PATENTS

| 2,527,835 | Miller | Oct. 31, 1950 |
| 2,817,831 | Johnson et al. | Dec. 24, 1957 |
| 2,891,244 | Pastoriza | June 16, 1959 |
| 2,925,467 | Becker | Feb. 16, 1960 |

FOREIGN PATENTS

| 203,719 | Germany | Oct. 20, 1908 |
| 435,470 | Italy | May 18, 1948 |

UNITED STATES PATENT OFFICE
CERTIFICATE OF CORRECTION

Patent No. 3,106,707                    October 8, 1963

Francis T. Thompson

It is hereby certified that error appears in the above numbered patent requiring correction and that the said Letters Patent should read as corrected below.

Column 4, line 66, for "special" read -- spacial --; column 5, lines 56 and 57, for "conductors straight and in spaced parallel" read -- conductors in straight and spaced parallel --.

Signed and sealed this 14th day of April 1964.

(SEAL)
Attest:
ERNEST W. SWIDER

Attesting Officer

EDWARD J. BRENNER

Commissioner of Patents